United States Patent [19]

Letemps et al.

[11] Patent Number: 4,957,528
[45] Date of Patent: Sep. 18, 1990

[54] METHOD AND APPARATUS FOR BENDING AND TEMPERING GLASS PLATES

[75] Inventors: Bernard Letemps, Thourotte; Jacques Leclerco, Roisel; Philippe Dereims, Compiegne, all of France

[73] Assignee: Saint-Gobain Vitrage, Courbevoie, France

[21] Appl. No.: 362,654

[22] Filed: Jun. 7, 1989

[30] Foreign Application Priority Data

Jun. 7, 1988 [FR] France .................................. 88 07532

[51] Int. Cl.⁵ ..................... C03B 23/033; C03B 27/04
[52] U.S. Cl. ........................................ 65/104; 65/106; 65/273
[58] Field of Search .................. 65/273, 107, 251, 104, 65/106

[56] References Cited

U.S. PATENT DOCUMENTS

| | | | |
|---|---|---|---|
| 3,782,916 | 1/1974 | Powell et al. | 65/104 |
| 4,123,246 | 10/1978 | Johnson | 65/104 |
| 4,292,065 | 9/1981 | Nedelec et al. | 65/104 |
| 4,540,426 | 9/1985 | Bocelli et al. | 65/104 X |

*Primary Examiner*—Joye L. Woodard
*Attorney, Agent, or Firm*—Oblon, Spivak, McClelland, Maier & Neustadt

[57] ABSTRACT

A bending and hardening installation includes a shaping bed, an evacuation conveyor positioned downstream of the shaping bed and a tilting device for tilting a glass plate exiting the downstream end of the shaping bed from the shaping bed to the evacuation conveyor. The shaping end is curved in a direction of advance of the glass plate and has a conveying direction different from that of the evacuation conveyor. The tilting device takes the form of a rotating drum mounted coaxially with a support roller. The drum includes holding rollers spaced from the support roller by a distance sufficient that a glass plate exiting the shaping bed is held between a holding roller and the support roller, so that the tilting device is tilted by the weight of the glass plate to a positoin where the glass plate is transferred to the evacuation conveyor. An air blowing box is provided on the tilting device for hardening the glass plate as it is being tilted.

8 Claims, 4 Drawing Sheets

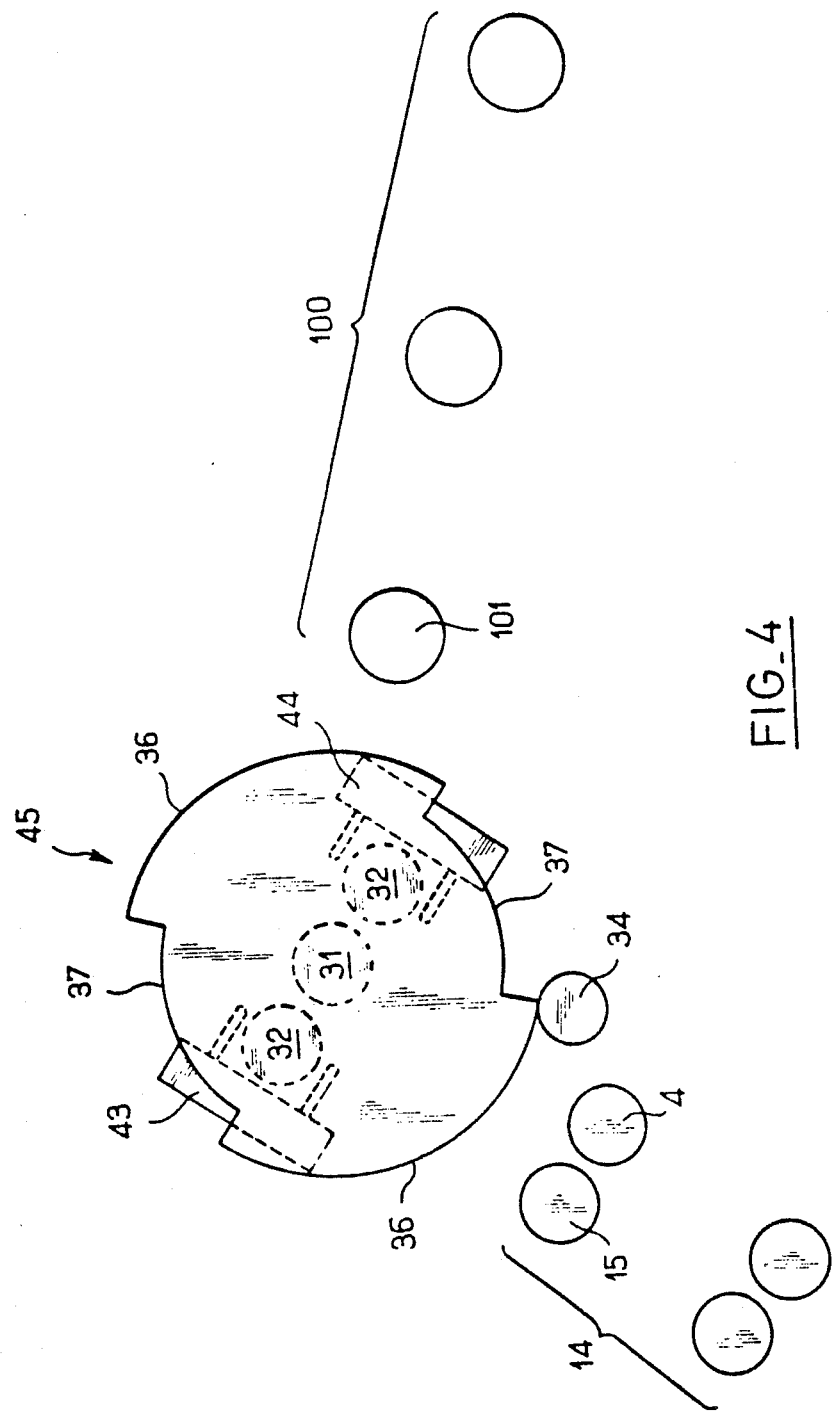

METHOD AND APPARATUS FOR BENDING AND TEMPERING GLASS PLATES

BACKGROUND OF THE INVENTION

1. Field of the Invention

The present invention relates to the convex bending or cambering of glass plates and to their tempering or hardening. It more particularly relates to the convex bending and hardening procedure in which the glass plates undergo convex bending, while being conveyed on a conveyor whose glass plate support members are arranged along a curved trajectory or path.

2. Background of the Related Art

A convex bending procedure, optionally extended by a thermal hardening, is described in French Patents No. 2 442,219 U.S. Pat. No. 4,540,426 and in European Patent No. 263 030. In these specifications, a description is given of conveyors with linear rollers, whose bearings are located along a curved path, which is descending or preferably rising, so as to give the glass plates raised to their convex bending temperature and which are therefore deformable under the effect of gravity, a simple curvature, i.e. a curvature in a single direction, or cylindrical curvature when they are travelling on these conveyors. A description is also given of conveyors having rollers or bent rods, whose bearings are, as above, arranged along a curved path, thus constituting for the glass plates heated to the convex bending temperature travelling thereon, a double curvature shaping bed, namely curvature both in the direction of travel of the glass plates as a result of the arrangement of the rollers or bent rods along the curved path, and a transverse curvature in the direction perpendicular to the travel direction, as a result of the bent form of the rollers or rods.

The aforementioned U.S. Pat. No. 4,540,426 also proposes a recovery of the glass plates at the upper end of the convex bending and hardening apparatus with a curved profile in the glass plate advance direction. This recovery is carried out by a swinging or tilting system in which each glass plate is engaged at the end of the convex bending and hardening operation, said system swinging or tilting under the effect of the overhang created by the weight of the glass plate and depositing said plate on a conveyor which does not have the inclined orientation of the end of the convex bending and hardening apparatus, but instead has a different orientation which can be substantially horizontal if desired. After tilting each glass plate onto the discharge conveyor, the tilting system freed from the overhang created by the glass plate returns by reverse tilting to its initial waiting position for the following glass plate.

This tilting system is satisfactory. However, it is only used for the tilting of the glass plates and the time devoted to its passage by the plates is dead time, i.e. time during which the state of the glass plates, i.e. the convex bending or hardening, does not undergo any development.

SUMMARY OF THE INVENTION

The present invention has as an object to improve the efficiency of this convex bending-hardening installation by eliminating this dead time.

For this purpose it proposes a process for the recovery of glass plates in a convex bending and hardening installation incorporating a shaping bed with a profile curved in the glass plate advance direction, in which the glass plates, towards the downstream end of said installation, change direction, while being engaged in a tilting system and being tilted by said system into an orientation differing from that which they had before being taken up by the tilting system. During the change of direction and in particular during the passage into the tilting system, the glass plates are subject to the blowing action of a gas which cooperates in the hardening thereof.

Advantageously, the process is such that after a glass plate has been abandoned by the tilting system, the latter is brought into a position for the recovery of a new glass plate, either without complementary rotation, or by a reduced angle of rotation, which is less than the angle by which the system has to turn for tilting a glass plate.

According to the present invention, there is provided a bending and hardening installation comprising a shaping bed having means for supporting and shaping a heated glass plate moving in a conveying direction along the shaping bed, the shaping bed being curved in the evacuation direction, an evacuation conveyor position downstream of the shaping bed in the conveying direction and having a conveying direction non-coplanar with the conveying direction of the shaping bed at a downstream end of a shaping bed, and tilting means for tilting a glass plate exiting the downstream end of the shaping bed from the conveying direction of the downstream end of the shaping bed to the conveyor direction of the evacuation conveyor. The tilting means includes a rotatable glass plate support element aligned with, and immediately downstream of, the means for supporting and shaping. It also includes at least one holding means mutually spaced from the axis of the support element. The holding means each are rotatable about an axis extending parallel to the axis of the support element, the axes of the holding means being rotatable together as a drum about the axis of the support element and independent of the rotation of the support element. The holding means are each spaced from the support element such that a glass plate exiting the downstream and the shaping bed is held between the glass plate support element and the holding means when the holding means is at a receiving position in which the space between the support element and the one of the holding means is aligned with the glass plate exiting the downstream end of the shaping bed, so that the weight of a glass plate rotates the drum to a drive position in which the glass plate is tilted to the conveying direction of the evacuation conveyor. There are also provided means for periodically driving the drum from the drive position to the receiving position, as well as blowing means for blowing cooling air on a glass plate held by the tilting means.

Thus, in a glass plate convex bending and hardening installation of the aforementioned type, the length over which the glass plates undergo cooling gas blowing is greater and this leads to a possibility of the glass plates travelling at a higher speed, or it is possible to shorten the length reserved for the hardening on the curved bed, which leads to an improvement in the efficiency of the installation.

Moreover, in the tilting system described in U.S. Pat. No. 4,540,426 the time of tilting in the reverse direction for returning a new glass plate to the reception position is excessive and limits the speed of the convex bending-hardening procedure. According to this procedure, the glass plates could follow one another at a higher speed and virtually with no interval between them, since it is not necessary to await the return to the reception position of the tilting system.

The present invention thus eliminates this speed limitation introduced by the tilting system for the recovery of the glass plates at the outlet from the convex bending-hardening installation, so as to be able to take advantage of the possibilities of the convex bending-hardening procedure for glass plates on a shaping bed with a profile curved in the direction of advance of the glass plates.

Advantageously, the tilting system according to the invention, equipped with blowing means, is also constructed so as to have a plurality of reception positions for new glass plates, which reduces the rotation angle for passing into the reception position following the transfer of a glass plate, which consequently reduces the time for bringing a plate into the reception position.

The mere addition of the blowing means at the tilting system makes it possible to improve the travel speed of the glass plates by approximately 10 to 25% and the increase in the number of reception positions for new glass plates further increases the speed by the same proportion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 shows a tilting system according to FIG. 3 modified so as to have a plurality of reception positions for the glass plates;

DETAILED DESCRIPTION OF THE PREFERRED EMBODIMENTS

Figure 1:
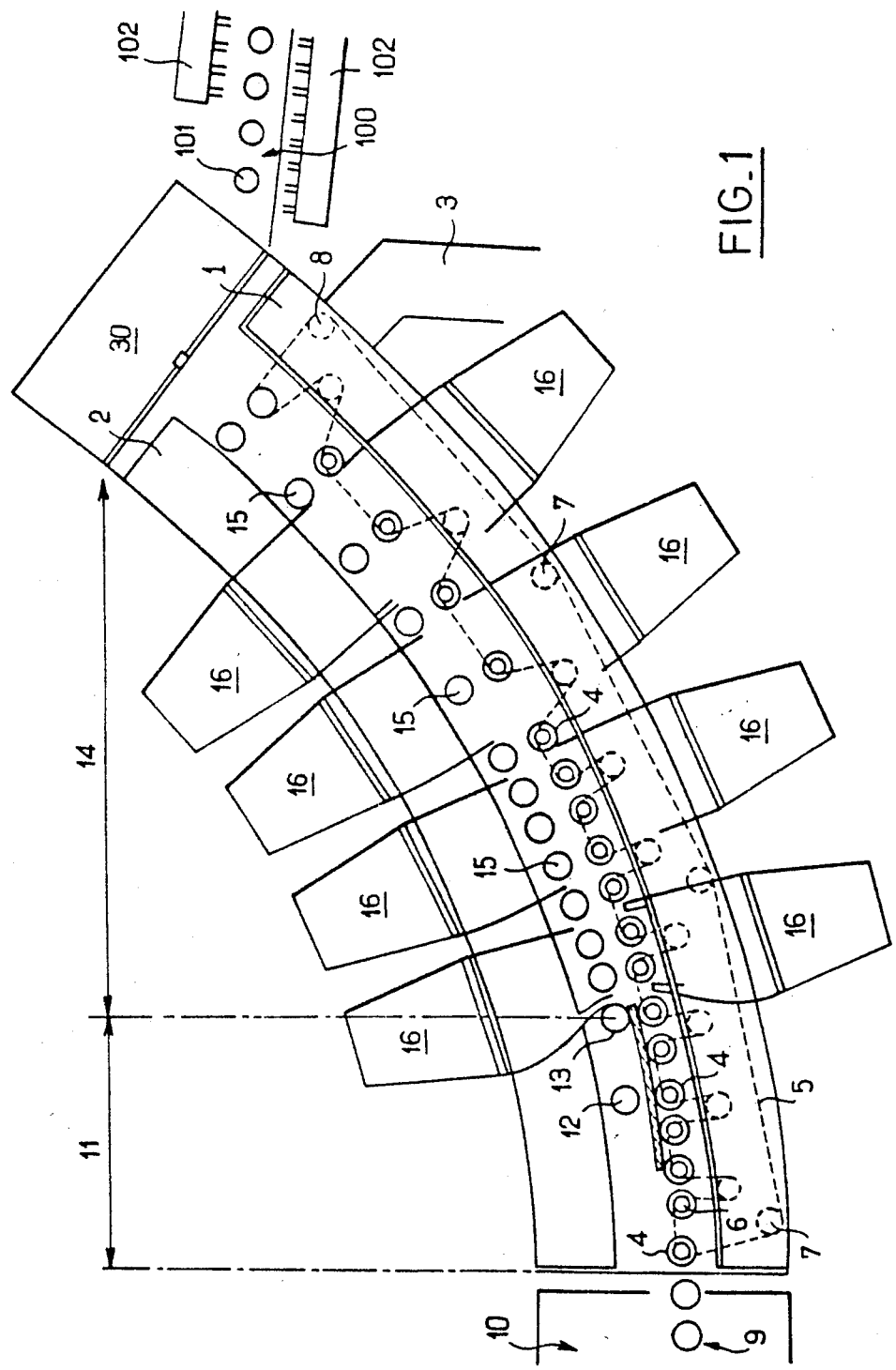
FIG. 1 is a schematic view of a convex bending and hardening installation for which a tilting system according to the invention is provided.

FIG. 1 shows an installation of bending and tempering of glass plates to which the tilting or swinging devices according to the invention are provided. It has two frame elements 1 and 2, a lower element 1 and an upper element 2, curved in the direction of their length and carried by a frame 3.

Lower element 1 is equipped with elements 4 supporting the glass, such as straight rollers placed parallel to one another in the width direction of the installation. These elements 4 rotate about fixed axes and are driven by a chain 5 acting on pinions 6 placed at the end of the rollers. The chain 5 is kept taut with the assistance of tension and return pinions 7, driven from a drive shaft 8.

Elements 4, in particular the straight rollers placed one after another, define a shaping bed for the glass plates with a curved profile in the conveying direction of a glass plate which exits from feeding conveyor 9 of a glass heating furnace 10. Preferably, the shaping bed thus constituted is aligned with conveyor 9 so as to offer to the glass plates a continuous path, that is a regular path without jerks, breaks or jumps.

Upper element 2 is equipped, at least in some parts, with upper means for holding the glass plates such as rollers 15. Advantageously, as shown in FIG. 1, such rollers 15 do not exist in a first zone 11 where the bending is carried out; there optionally can exist in zone 11 means such as rollers 12 spaced at a distance relative to lower elements 4. The rollers 12 intervene only by way of safety, i.e., the glass plates passing on lower elements 4, if they bend themselves normally on the shaping bed and assume the shape of the bed, do not touch the rollers 12. At the edge of bending zone 11, just before a second, tempering zone 14, frame 2 is equipped with roller 13 as a means for assisting the advance of glass plate and making a barrier to the penetration of the tempering air into the bending zone. If lower elements 4 are rectilinear rollers (FIG. 2), the roller 13 should be of the same type, placed so as to be in contact with the upper face of the glass plates opposite lower roller 4 at the downstream end of bending zone 11, and driven at the same speed as lower rollers 4.

In tempering zone 14, which immediately follows bending zone 11, there are placed support elements 4, upper holding means (i.e., rollers 15), in contact with the glass and resting on it. Elements 4 and rollers 15 are of the same nature as elements 4 of zone 11, namely rectilinear rollers if rectilinear rollers constitute elements 4 of zone 11. In this zone 14 there are also placed blowing nozzles 16 intended to blow a cooling gas, generally air, on the glass to temper it. These nozzles 16 are placed so as to blow the cooling gas on both the lower face and the upper face of the glass.

The evacuation of the glass plates at the end of the installation described previously is achieved by a tilting device 30. This device 30 feeds the glass plates to a conveyor 100 having a conveying direction different from that of the installation immediately upstream from device 30. More precisely, immediately before device 30, the glass plates are in an inclined position, at times greatly inclined, whereas conveyor 100 has a horizontal or approximately horizontal position.

If support elements 4 of bending zone 11 and tempering zone 14 are rectilinear rollers, conveyor 100 itself also consists of rectilinear rollers 101 or equivalent elements (rollers, gas cushions, etc. . . . ).

In the installation described above, the glass plates acquire a simple bend, i.e. in a single direction, in the direction of their passage by their sagging on the shaping bed with a curved profile in the longitudinal direction.

Figure 5A:
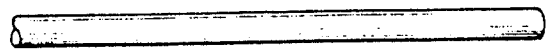
FIG. 5A illustrates linear rollers which can be used for equipping the convex bending-hardening installation and the tilter according to the invention.
Figure 5B:
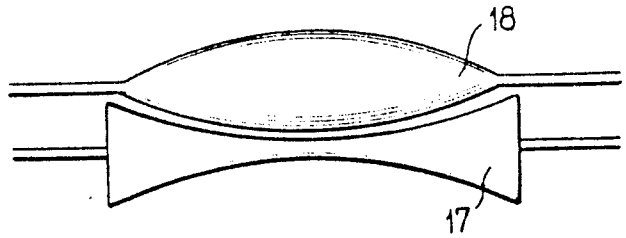
FIG. 5B corresponds to FIG. 5A but shows double cone/spindle-type rollers.

An installation of the same type can be provided to give the glass plates, in addition to their bend in the direction of their passage, a bend in the crosswise direction. In this case support elements 4 and rollers 12, 13 and 15 are modified consequently. For example, the rollers may be of the "twin wheel" type 17 and "spindle" type 18 (FIG. 5B), i.e. noncylindrical but having profiled shapes in which case lower elements 4 and upper rollers 15, 13 and optionally 12, have complementary shapes.

Figure 5C:
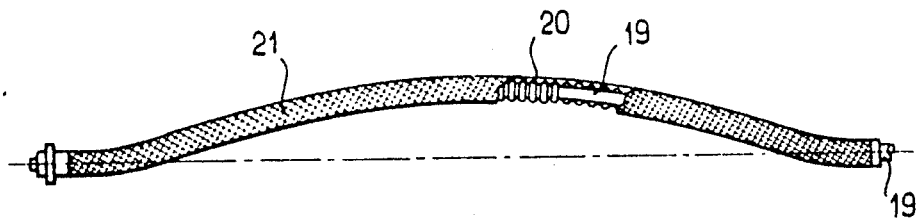
FIG. 5C corresponds to FIG. 5A but shows bent rods.

There may also be used curved rods or rollers, having (as shown in FIG. 5C) a non-rotatable curved rigid central core 19, covered by a ringed tubular sheath 20 which rigid in rotation but axially deformable, covered by a rotatably driven protective device 21 of braided or knitted glass or silica fibers. These curved rods or rollers are described more fully in French patent document Nos. 1 476 785, 92 074, 2 129 919, 2 144 523, 2 189 330.

Figure 5D:
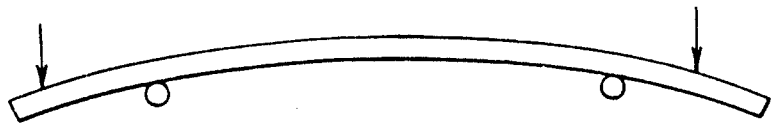
FIG. 5D corresponds to FIG. 5A but shows cambered rollers.

There may also be used curved rollers of another type, for example normally rectilinear rollers 22 curved by the effect of a stress exerted on their ends. These rollers are generally called "cambers" and are illustrated in FIG. 5D.

Conveyor 100 is also adapted to the type of bend of the glass plates to be transported and its elements supporting the glass plates will be of the same type as those installed in bending and tempering zones 11 and 14.

Figure 2:
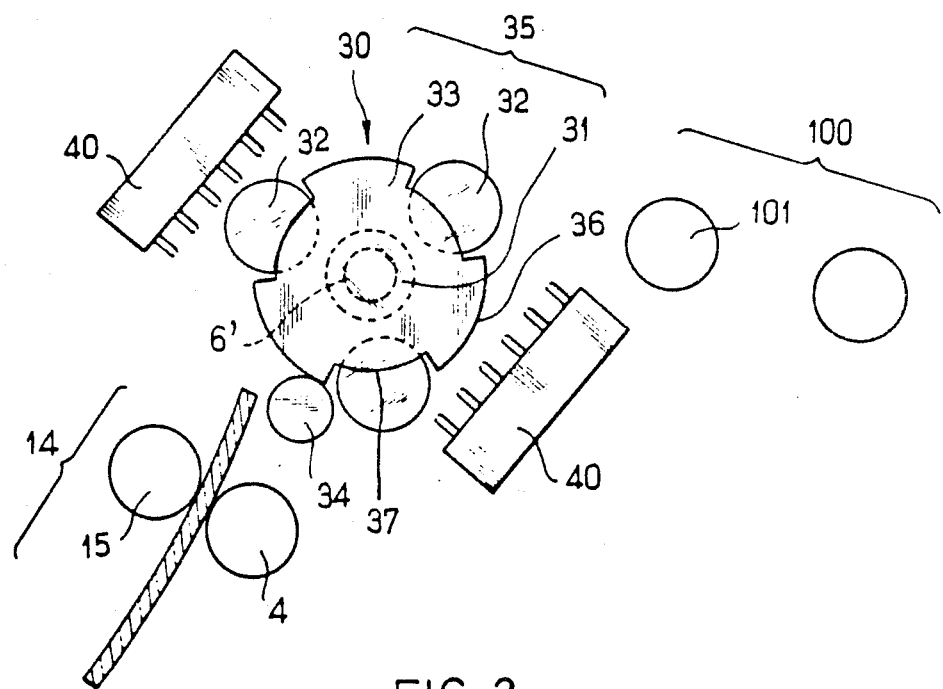
FIG. 2 shows a tilting system according to the invention associated with a blowing means.
Figure 3:
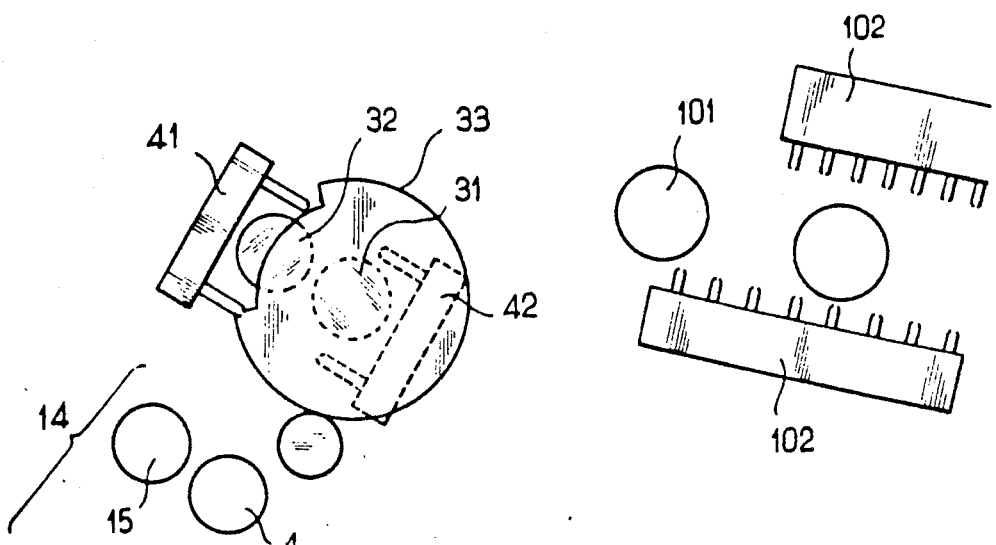
FIG. 3 shown a tilting system according to the invention on which are located the blowing means.

Tilting device 30 is, for example, of the type shown in FIGS. 2-4.

These FIGS. 2-4 all show the last pair of upper holding rollers 15 and support elements 4 at the end of tempering zone 14, and the first support elements 101 of horizontal or approximately horizontal conveyor 100.

As already said, these rollers 15, elements 4 or elements 101 can be, depending on the type of bend desired for the glass plates, rectilinear rollers or curved rollers, camber rollers, or profiled rollers.

To simplify the description of tilting device 30, we will take the example of a bending-tempering installation intended to produce glass plates having only a simple bend, it being understood that the invention is not limited to this single embodiment, but that it also applies to installations making it possible to produce glass plates with a double or complex bend.

The tilting device generally referenced as 30, essentially consists of a central support element, e.g., support roller 31, multiple identical associated holding means, e.g., holding rollers 32 evenly distributed around central support roller 31. Each of the holding rollers 32 is spaced from roller or element 31 so as to make possible the engagement of a glass plate between the two. Each roller 32 rotates about an axis extending parallel to the axis of the support roller 31. The axes of the holding rollers 32 together rotate about the axis of roller 31 so as to form a drum like shape. There are also provided means for periodically driving the drum defined by the holding rollers of the tilting device in rotation. Central support element 31 turns independently of the rotation of the drum and at the same speed as support elements 4 of the preceding zones 11 and 14. Advantageously the chain 5 that drives the rollers of zones 11 and 14 also engages on a pinion 6' located at the end of central support element 31.

The drum, including the element 31 and at least one cam 33, is referenced overall as 35, and is able to turn around the axis of support roller 31, independently of the rotation of this roller 31.

For example, the cam 33 may be mounted to one end of a spyder (not shown) rotatable about the axis of roller 31 and having rollers 32 journalled thereon.

The driving means for rotatably driving of drum 35 can be obtained by the cam 33 integral with support element 31 and associated holding means 32. Cam 33 is intermittently driven for rotation by at least one drive roller 34. The drive roller 34 is, for example, moved by chain 5 which drives support rollers 4 or by an additional chain driven by the same drive shaft 8 or by another independent drive shaft.

In this embodiment, the driving periodicity is obtained by the fact that cam 33 exhibits a contour having so-called "active" zones 36 able, when they align with roller 34, to be in contact with it, thereby rotatably driving drum 35, and so-called "inactive" zones 37 which, even when they are aligned with roller 34 are not in contact with it, which means that drum 35 is not driven at this time. Cam 33 may be a circular disk placed at the end of rollers 31 and 32 and extending perpendicular to them; active zones 36 consist of portions of circumference of radius R and the inactive zones 37 consist of portions of circumference of radius r less than R, which constitutes on the disk of cam 33 a series of notches or scallops.

Active parts 36 and inactive parts or scallops 37 are arranged so that drum 35 is driven in rotation from a drive position that it has after having tilted a glass plate on conveyor 100, to a receiving position in which central support roller 31 and one of holding rollers 32 which are associated with it in drum 35, are aligned with and ready to receive a new glass plate at the end of the shaping bed with curved profile.

The surface of roller 34 and/or cam 33 is of a material of the rubber type which favors the driving of cam 33 by simple contact.

Optionally, roller 34 can be equipped with a torque limiting clutch, i.e. a device assuring its immobility when the resistance to rotation exceeds a predetermined value. Thus when roller 34 is at a drive position at the beginning of the active part, but the glass plate already resting on evacuation conveyor 100 is not yet totally disengaged from support roller 31 and holding roller 32 so that the rotation of drum 35 is blocked, the torque limiting clutch intervenes.

To avoid the use of a torque limiting clutch, inclined ramps can be provided at the borders between an inactive zone 37 to an active zone 36, making possible the gradual engagement of roller 34, and its slipping, as long as the resistance to the rotation exists.

Other means being able periodically to drive drum 34 in rotation are possible. Thus roller 34 can be equipped with a motor or, more generally, by a driving means put into operation only periodically. In this case, the cut-outs of the cam to produce active portions 36 and inactive portions 37 are unnecessary. Thus the drum also can have its own motor, put into operation periodically.

To obtain the best output from the installation so that the time of bringing the drum into a receiving position is as short as possible, it is essential that the rotation of drum 35 necessary for it to come into the drive position after having delivered a glass sheet be the smallest possible angle of rotation. The case where no additional rotation is necessary is ideal, but it must correspond both to the very particular respective positions of the shaping bed and evacuation conveyor 100 as well as to a distribution of holding means 32 around support element 31 corresponding to these respective positions.

In FIG. 2, the construction shown comprises 3 holding rollers 32 regularly distributed on the periphery of central support roller 31, and cam 33 comprises three active parts 36 separated in pairs by inactive parts 37.

Holding rollers 32 are mounted at a predetermined distance relative to central support roller 31 this distance corresponding to the thickness of the glass plates to be treated and being adjustable to adapt to various possible glass thicknesses.

The device operates in the way described below.

When waiting for a glass plate advancing in the bending-tempering installation in the curved shaping bed, first in bending zone 11 then in tempering zone 14, drum 35 of the tilting device is positioned in a receiving position such that one of the spaces separating central support roller 31 from a holding roller 32 is aligned with an extension of the corresponding spaces located upstream in zone 14. During this time, drum 35 is not rotated and for this purpose drive roller 34 does not act on cam 33, i.e., it is aligned with the beginning of an inactive scallop 37. The glass plate is inserted at its front edge between support roller 31 and opposite holding roller 32 placed in a receiving position. Driven by lower support rollers 4 of the tempering zone, by support roller 31 and optionally by upper holding rollers 15, the glass plate advances according to the conveying direction in tilting device 30, the latter remaining immobile.

When the rear edge of the glass plate is freed from the unit consisting of last lower roller 4 of zone 14 and the associated last upper roller 15, drum 35 is free to tilt, which it does when the part of the glass plate having gone beyond roller 31 and roller 32 is sufficient for its weight to turn the device. The device turns in a rotating directions until the glass plate rests on evacuation conveyor 100. During this rotation which is carried out solely under the effect of the weight of the glass, cam 33 turns from the inactive scalloped part 37 opposite the beginning of which is located roller 34 before the rotation, to a drive position in which the beginning of an active part 36 of cam 33 is now opposite drive roller 34. Until the glass plate is totally clear of the two rollers of support 31 and holding 32, roller 34 slips on the beginning of active part 36 where the torque limiting intervenes. Then as soon as the glass plate is freed, there is no longer any brake to the rotation of the drum and the latter is driven by roller 34 in the rotating direction until this roller 34 reaches, after having rolled over an entire active sector 36, the beginning of a new inactive sector 37.

According to the invention there is a blowing of gas, generally air, at the position of the tilting device 30, in order to cooperate in the hardening of the glass plates passing through the device 30.

As shown in FIG. 2, this can involve one or more stationary blowing boxes or ramps 40 arranged in fixed manner facing the tilting device 30 and able to blow in the direction of the glass plates during their advance and before being tilted. These ramps or boxes 40 are preferably positioned at one or preferably two sides of the device 30, so as to preferably affect the two faces of the glass plates.

According to another embodiment illustrated in FIG. 3, the blowing means are carried by the device 30 and follow the glass plates in their tilting movements. Thus, blowing boxes 41,42 are positioned beyond the rollers 31 and 32, so as to blow approximately perpendicularly to the plane of the glass plates on the faces thereof passing through the device 30 while held and supported by the rollers 31,32.

Advantageously facing the conveyor 100, blowing means 102 are also provided for assisting in the hardening of the glass plates. These means 102 can be positioned either above or below the conveyor 100, but preferably they are both above and below the conveyor 100, so as to act on both glass plate faces.

Advantageously, the upwardly directed blowing arrangement beneath the conveyor 100 can be used for damping the engagement of the glass plates with the said conveyor.

In another embodiment illustrated in FIG. 4, in order to obtain the best efficiency of the installation while shortening the time of bringing the drum into the receiving position, several reception positions are provided on the drum for new glass plates. Thus, the angle of rotation of the drum is smaller than in the case of a single reception position, which leads to a time saving and makes it possible to follow the glass plates in the installation with smaller gaps.

In FIG. 4, the construction shown has two holding rollers 32, arranged symmetrically with respect to the central support roller 31 and the cam 33 has two active parts 36 separated by two inactive parts 37.

As hereinbefore, the holding rollers 32 are mounted so as to have facing the central support roller 31 a clearly defined gap, which corresponds to the thickness of the glass plates to be treated and which is regulatable in order to adapt to the different possible glass thicknesses. Constructions with more than two holding rollers 32 are also possible.

To the extent that the blowing members at the device 30 are not carried by the latter, but are instead fixed to the general frame of the installation, it is possible to have three, four or more holding rollers for each drum. However, when the blowing means are carried by the drum, the device is often limited to two holding rollers 32 in order to avoid excessive overall dimensions.

In this case, blowing boxes 43,44, e.g. equipped with tubular nozzles, are provided on the periphery of drum 45, extending parallel to the rollers 31 and 32 and preferably symmetrical to the central roller 31. They are preferably arranged in the manner shown in FIG. 4, so as to blow on the glass plates during their passage through device 30 in a direction approximately perpendicular to their faces. As hereinbefore, conveyor 100 can be advantageously equipped with blowing means. In addition, blowing means can also be carried by the device and simultaneously other blowing means can be fixed.

These blowing means function in the manner described hereinafter. When a glass plate at the end of zone 14 is taken up by the device 30, it is inserted between the central support roller 31 and the holding roller 32 facing it and passes between them.

During this time the blowing means, which are either fixed and outside the tilter, or carried by the tilter, blow and thus ensure a continuity of the glass hardening treatment. When the glass plate has adequately advanced in the device 30 and its rear edge is freed from the pair of fixed rollers 4,15 of zone 14, the drum can tilt as soon as the overhang created by the weight of the glass is adequate. When the blowing means are carried by the drum, blowing continues even during the tilting operation.

In the case where the blowing means are not carried by the device 30, the blowing action on the glass plate is reduced when it tilts.

However, bearing in mind that this tilting time is short compared with the entire time during which the glass plate has advanced into the device 30 prior to tilting, there is a virtual blowing continuity. On engagement with the conveyor 100, blowing once again begins if the said conveyor is equipped with blowing means. When the device 30 is freed from the glass plate, it turns in order to receive a new glass plate.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A bending and hardening installation comprising:
   a shaping bed having means for supporting and shaping a heated glass plate moving in a conveying direction along said shaping bed, said shaping bed being curved in said conveying direction;
   an evacuation conveyor positioned downstream of said shaping bed in the conveying direction, and having a conveying direction non-coplanar with the conveying direction of said shaping bed at a downstream end of said shaping bed; and
   tilting means for tilting a glass plate exiting the downstream end of said shaping bed from said conveying direction of the downstream end of said shaping bed to said conveyor direction of said evacuation conveyor, comprising:
   a rotatable glass plate support element having an axis aligned with, and immediately downstream of, said means for supporting and shaping,
   at least one holding means spaced from the axis of said support element, said holding means being rotatable about an axis extending parallel to the axis of said support element, said axis of said holding means being rotatable as a drum about the axis of said support element and independent of rotation of said support element, said holding means being spaced from said support element such that a glass plate exiting the downstream end of said shaping bed is held between said glass plate support element and said holding means when said holding means is at a receiving position wherein the space between said support element and said holding means is aligned with the glass plate exiting said downstream end of said shaping bed, whereby the weight of a glass plate rotates the drum in a rotating direction to a drive position in which the glass plate is tilted to the conveying direction of said evacuation conveyor;
   means for periodically driving said drum in said rotating direction from said drive position to a new receiving position; and
   blowing means for blowing cooling air on a glass plate held by said tilting means.

2. The installation of claim 1 wherein said driving means comprise:
   a cam fixed to said axis of said holding means wherein said holding means and said cam together comprise said drum; and
   a drive roller engageable with a cam portion of said cam when said drum is at said drive position.

3. The installation of claim 2 wherein said at least one holding means comprises two holding means arranged symmetrically around said support means, and said blowing means comprises two blowing boxes mounted to said tilting means and arranged symmetrically around said support means and on the periphery of said holding means, said blowing boxes being arranged to blow cooling air on both sides of glass plates held by said tilting means.

4. The installation of claim 1 wherein said blowing means comprises means for blowing air onto both sides of the glass plate held by said tilting means.

5. The installation of claim 4 wherein each of said blowing means comprises a blowing box associated with said holding means.

6. The installation of claim 4 wherein blowing said evacuation conveyor further includes means.

7. The installation of claim 4 wherein said blowing means are stationary and positioned adjacent said tilting mean 8. A process for receiving glass plates in a bending and hardening installation, comprising the steps of:
   discharging a glass plate in a conveying direction from a bending and tempering means into a tilting means;
   tilting the discharged glass plate by tilting the tilting means from said conveying direction of said bending and tempering means to a non-coplanar conveying direction;
   blowing cooling gas onto said glass plate during said tilting step; and
   returning said tilting means to a position for receiving another glass plate from said bending and tempering means by tilting said tilting means about an angle less than an angle swung in said tilting step, whereby the tilting means may rapidly receive another glass plate.

* * * * *

UNITED STATES PATENT AND TRADEMARK OFFICE
CERTIFICATE OF CORRECTION

PATENT NO. : 4,957,528
DATED : SEPTEMBER 18, 1990
INVENTOR(S) : BERNARD LETEMPS ET AL.

It is certified that error appears in the above-identified patent and that said Letters Patent is hereby corrected as shown below:

On the title page item [75] Inventors:

The second inventor's last name is incorrectly spelled. Please delete "Leclerco" and insert --Leclercq--.

Signed and Sealed this

Seventeenth Day of March, 1992

*Attest:*

HARRY F. MANBECK, JR.

*Attesting Officer*     *Commissioner of Patents and Trademarks*